(12) United States Patent
Yang

(10) Patent No.: US 8,164,271 B2
(45) Date of Patent: *Apr. 24, 2012

(54) UNI-DIRECTIONAL LIGHT EMITTING DIODE DRIVE CIRCUIT IN BI-DIRECTIONAL POWER SERIES RESONANCE

(76) Inventor: Tai-Her Yang, Dzan-Hwa (TW)

( * ) Notice: Subject to any disclaimer, the term of this patent is extended or adjusted under 35 U.S.C. 154(b) by 462 days.

This patent is subject to a terminal disclaimer.

(21) Appl. No.: 12/351,916

(22) Filed: Jan. 12, 2009

(65) Prior Publication Data

US 2009/0179582 A1    Jul. 16, 2009

Related U.S. Application Data

(60) Provisional application No. 61/020,821, filed on Jan. 14, 2008.

(51) Int. Cl.
*H05B 41/16* (2006.01)
*H05B 41/24* (2006.01)

(52) U.S. Cl. .................. 315/283; 315/209 R; 315/291; 315/307

(58) Field of Classification Search .................. None
See application file for complete search history.

(56) References Cited

U.S. PATENT DOCUMENTS

2007/0210719 A1* 9/2007 Busse et al. .................. 315/158
2010/0052554 A1* 3/2010 Zanforlin ...................... 315/210

* cited by examiner

*Primary Examiner* — Anh Tran
(74) *Attorney, Agent, or Firm* — Rabin & Berdo, P.C.

(57) ABSTRACT

The present invention uses series connected capacitive impedance and inductive impedance, whereof the inherent series resonance and the frequency of the bi-directional power can produce series resonance, thereby the bi-directional divided power being generated at the two ends of the capacitive impedance and inductive impedance is rectified to output DC power to drive the uni-directional light emitting diode.

7 Claims, 7 Drawing Sheets

UNI-DIRECTIONAL LIGHT EMITTING DIODE DRIVE CIRCUIT IN BI-DIRECTIONAL POWER SERIES RESONANCE

BACKGROUND OF THE PRESENT INVENTION (a) Field of the Present Invention

The present invention discloses a bi-directional power such as AC power or periodically alternated power which is provided to a capacitive impedance component and an inductive impedance component in series connection, whereof their series resonance frequency is in series resonance status with the frequency or period of the bi-directional power source, whereof the bi-directional divided power produced across the two ends of the capacitive impedance component or the inductive impedance component is rectified through a rectifier device to a DC power, whereby to drive the uni-directional conducting light emitting diode, or to drive at least two rectifier devices which are respectively parallel connected across the two ends of the first and second impedances while the AC powers of the first and second impedance are respectively rectified through the said rectifier devices to the DC power outputs, thereby to drive the uni-directional conducting light emitting diodes individually.

When in the high frequency bi-directional power applications, the uni-directional light emitting diode drive circuit in bi-directional power series resonance of the present invention can effectively reduce the volume and weight of the circuit as well as lower the cost.

(b) Description of the Prior Art

The conventional light emitting diode drive circuit using AC or DC power source is usually series connected with current limit resistors as the impedance to limit the current to the light emitting diode, whereof the voltage drop of the series connected resistive impedance always result in waste of power and accumulation of heat which are the imperfections.

SUMMARY OF THE PRESENT INVENTION

The uni-directional light emitting diode drive circuit in bi-directional power series resonance which is disclosed by that the capacitive or inductive impedance components in series connection are powered by a bi-directional power such as AC power or periodically alternated polarity power, whereof its inherent series resonance frequency is the same as the frequency or period of the bi-directional power from source power so it appears in series resonance status, and it is characterized in that the bi-directional divided power in series resonance across the two ends of the capacitive impedance component or the inductive impedance component is rectified by a rectifier device to the DC power output, thereby to drive the uni-directional conducting light emitting diode set to emit light.

DESCRIPTION OF MAIN COMPONENT SYMBOLS

Figure 1:
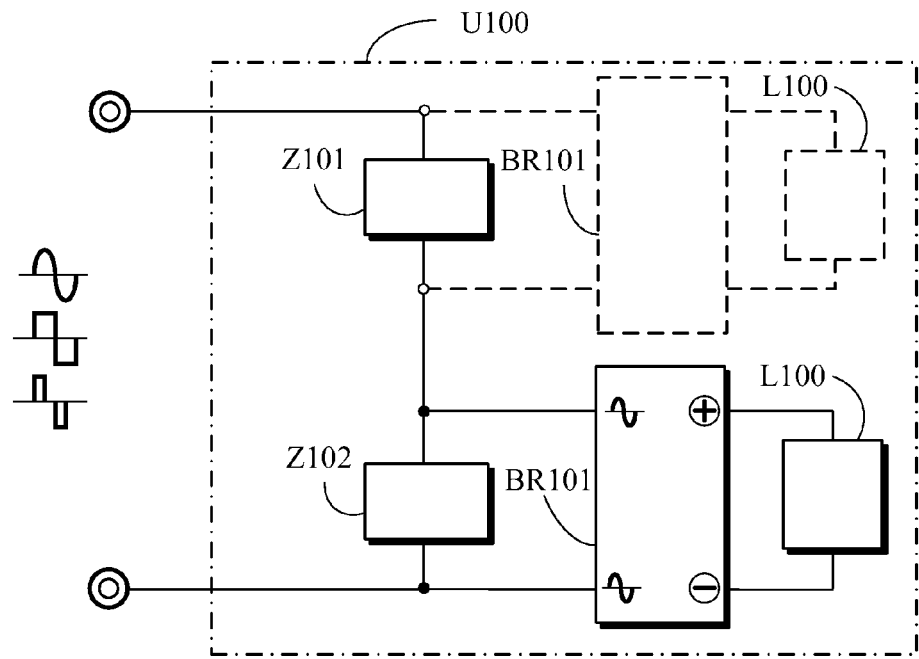
FIG. 1 is the schematic block diagram of the uni-directional light emitting diode drive circuit in bi-directional power series resonance.

BR101: Rectifier device
C100: Capacitor
CR201: Diode
ESD101: Charge/discharge device
I103, I200: Inductive impedance component
IT200: Separating type transformer
L100: Uni-directional conducting light emitting diode set
LED101: Light emitting diode
R101: Discharge resistor
R103: Current limit resistor
ST200: Self-coupled transformer
U100: Uni-directional light emitting diode (LED) drive circuit
W0: Self-coupled voltage change winding
W1: Primary side winding
W2: Secondary side winding
Z101: First impedance
Z102: Second impedance
ZD101: Zener diode
300: Bi-directional power modulator of series connection type
360: DC power modulator of series connection type
400: Bi-directional power modulator of parallel connection type
460: DC power modulator of parallel connection type
500: Impedance component 600: Switching device
4000: DC to AC inverter

DETAILED DESCRIPTION OF THE PREFERRED EMBODIMENTS

The uni-directional light emitting diode drive circuit in bi-directional power series resonance of the present invention, in which the uni-directional light emitting diode drive circuit (U100) is mainly comprised of at least one first impedance which is constituted by at least one capacitive impedance component and at least one second impedance which is constituted by at least one inductive component, whereof the inherent series resonance frequency of the first impedance and the second impedance in series connection is the same as the frequency of the bi-directional power from the power source such as AC power, or the period of alternated polarity of the constant or variable periodically alternated polarity power which is converted from DC power, thereby to appear in series resonance status;

The two ends of the first impedance and the second impedance in series connection are provided to input:
1) The AC power with constant or variable voltage and constant or variable frequency; or
2) The AC power of bi-directional sinusoidal wave voltage or bi-directional square wave voltage, or bi-directional pulse wave voltage with constant or variable voltage and constant or variable frequency or periods which is converted from a DC power source; or
3) The AC power of bi-directional sinusoidal wave voltage or bi-directional square wave voltage, or bi-directional pulse wave voltage with constant or variable voltage and constant or variable frequency or periods converted from the DC power which is further rectified from an AC power;

Thus, by means of above said powers to form the divided powers at the first impedance and the second impedance;

Further, at least one rectifier device is installed, whereof its AC input ends are provided to receive the divided power across the two ends of at least one of the first impedance (Z101) or the second impedance (Z102), or it is installed with at least two rectifier devices, whereof their AC input ends are respectively provided to receive the divided power across the two ends of the first impedance and the second impedance;

Further, the unidirectional conducting light emitting diode set is constituted by at least one light emitting diode, whereof it is arranged to be driven by the DC power output from the positive and negative output ends of a rectifier device;

The divided power of the first or second impedance is rectified by the rectifier device to DC power for driving at least one uni-directional conducting light emitting diode or for driving at least two rectifier devices which are respectively parallel connected across the two ends of the first and second impedances to respectively receive the AC powers of the first and second impedances to rectify to DC power output, whereby to drive the individual uni-directional conducting light emitting diode; thus to constituted the uni-directional light emitting diode drive circuit in bi-directional power series resonance of the present invention.

FIG. 1 is the schematic block diagram of the uni-directional light emitting diode drive circuit in bi-directional power series resonance, in which the circuit function is operated through the uni-directional light emitting diode drive circuit (U100) as shown in FIG. 1, whereof it is comprised of:

A first impedance (Z101) which is mainly constituted by at least one capacitive impedance component, or two or more than two capacitive impedance components in series connection or parallel connection or series and parallel connection, or A first impedance (Z101) is comprised of at least one capacitive impedance component, and one kind or more than one kind and one or above one optionally installed additional inductive impedance components or resistive impedance components, or additional two or more than two kinds of impedance components, whereof each kind of impedance components are constituted by one or more than one in series connection or parallel connection or series and parallel connection;

A second impedance (Z102) is mainly constituted by at least one inductive impedance component or two or more than two inductive impedance components in series connection, or parallel connection, or series and parallel connection, or A second impedance (Z102) is comprised of at least one inductive impedance component, and one kind or more than one kind and one or above one optionally installed additional capacitive impedance components or resistive impedance components, or additional two or more than two kinds of impedance components, whereof each kind of impedance components are constituted by one or more than one in series connection or parallel connection or series and parallel connection;

At least one first impedance (Z101) and at least one second impedance (Z102) are mutually series connected; the two ends of the first impedance (Z101) and the second impedance (Z102) after series connection is arranged to input:
1) The AC power with a constant or variable voltage and a constant or variable frequency; or
2) The AC power of bi-directional sinusoidal wave voltage or bi-directional square wave voltage, or bi-directional pulse wave voltage with constant or variable voltage and constant or variable frequency or period which is converted from a DC power source; or
3) The AC power of bi-directional sinusoidal wave voltage or bi-directional square wave voltage, or bi-directional pulse wave voltage with constant or variable voltage and constant or variable frequency or period converted from the DC power which is further rectified from an AC power;

The inherent series resonance frequency of the at least one first impedance component (Z101) and at least one second impedance (Z102) in series connection is the same as the frequency of the AC power source or the period of the periodically alternated polarity DC power source to appear series resonance status, whereof the first impedance (Z101) and the second impedance (Z102) convert the bi-directional power input to form the bi-directional divided power in series resonance, which is arranged to transmit to the AC input ends of the rectifier device (BR101);

A rectifier device (BR101): It is parallel connected across the two ends of the first impedance (Z101) or the second impedance (Z102), or respectively parallel connected across two ends of the first impedance (Z101) and the second impedance (Z102) simultaneously, thereby the divided power across the two ends of the first impedance (Z101) or the second impedance (Z102) is rectified to a DC power to drive the uni-directional conducting light emitting diode set (L100);

The rectifier device can be constituted by a bridge type rectifier device or by a half-wave rectifier device, whereof the number of rectifier device (BR101) can be one or more than one;

An uni-directional conducting light emitting diode set (L100): The uni-directional conducting light emitting diode set (L100) is constituted by a forward current polarity light emitting diode, or two or more than two forward current polarity light emitting diodes in series connection or parallel connection, or three or more than three forward current polarity light emitting diodes in series connection, parallel connection or series and parallel connection;

The uni-directional conducting light emitting diode set (L100) can be selected to be installed one set or more than one sets as needed, whereof it is arranged to be driven by the DC power outputted from the rectifier device (BR101);

One or more than one first impedance (Z101), second impedance (Z102), uni-directional conducting light emitting diode set (L100) and rectifier device (BR101) in the uni-directional light emitting diode drive circuit (U100) can be optionally installed as needed.

The divided power produced by the first impedance or second impedance is rectified by a rectifier device to DC power for driving at least one uni-directional conducting light emitting diode, or for driving at least two rectifier devices which are respectively parallel connected across the two ends of the first and second impedances, whereby the rectifier devices respectively receive the AC power of the first and second impedances to rectify to DC power output, thus to drive the individual uni-directional conducting light emitting diodes; thereby to constitute the uni-directional light emitting diode drive circuit in bi-directional power series resonance of the present invention.

Figure 2:
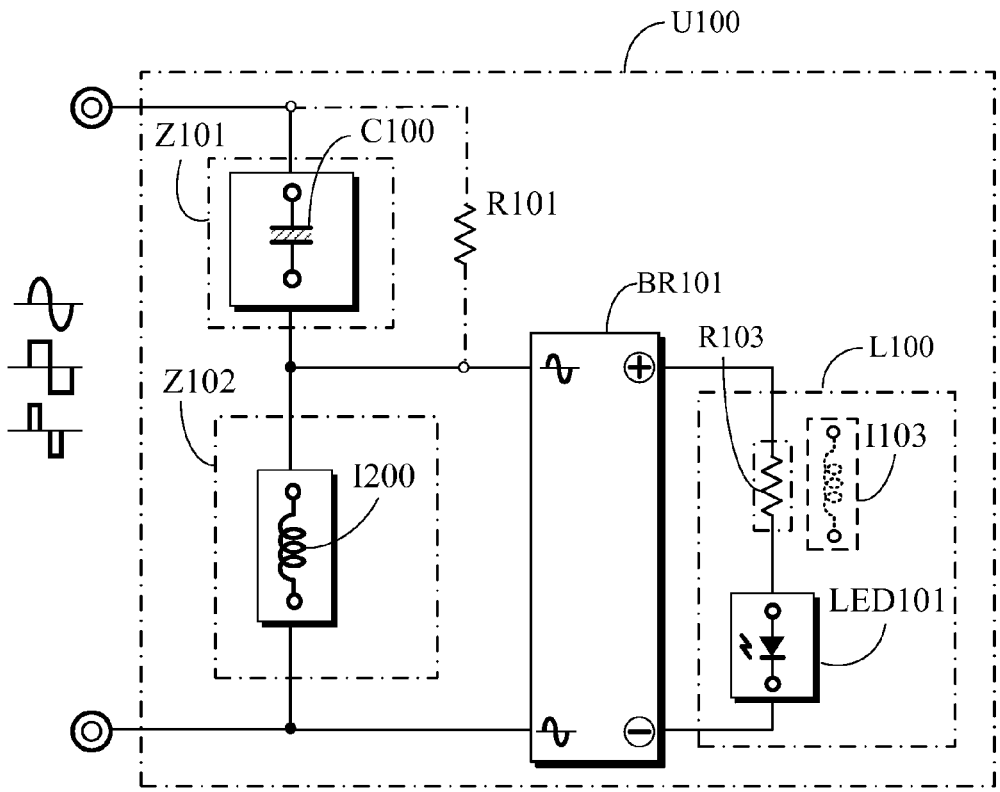
FIG. 2 is the circuit example schematic diagram of the present invention.

For convenience of description, the components listed in the circuit examples of the following exemplary embodiments are selected as following:

1) A first impedance (Z101), a second impedance (Z102), a rectifier device (BR101) and an uni-directional conducting light emitting diode set (L100) are installed in the embodied examples. Nonetheless, the selected quantities are not limited in actual applications;
2) A capacitive impedance of the capacitor is selected to represent the first impedance (Z101) and an inductive impedance component is selected to represent the second impedance (Z102) in the embodied examples, whereof various capacitive impedance components, inductive impedance components and resistive impedance components can be optionally selected as needed to be series connected, parallel connected or series can parallel connected in actual applications, whereof the inherent series resonance frequency of the first impedance and the second impedance in series connection is the same as the frequency of the AC power source or the period of the periodically alternated polarity DC power source to appear series resonance status, wherein it is described in the following:

FIG. 2 is the circuit example schematic diagram of the present invention which is mainly constituted by the following:

A first impedance (Z101): it is constituted by at least one capacitive impedance component, especially by the capacitor (C100), whereof the number of the first impedance (Z101) can be one or more than ones;

A second impedance (Z102): it is constituted by at least one inductive impedance component (I200), whereof the number of the second impedance (Z102) can be one or more than ones;

At least one first impedance (Z101) and at least one second impedance (Z102) are in series connection, whereof the two ends of them after series connection are provided for inputting:

1) The AC power with a constant or variable voltage and a constant or variable frequency; or
2) The AC power of bi-directional sinusoidal wave voltage or bi-directional square wave voltage, or bi-directional pulse wave voltage with constant or variable voltage and constant or variable frequency or period which is converted from a DC power source; or
3) The AC power of bi-directional sinusoidal wave voltage or bi-directional square wave voltage, or bi-directional pulse wave voltage with constant or variable voltage and constant or variable frequency or period converted from the DC power which is further rectified from an AC power;

The inherent series resonance frequency of the first impedance (Z101) and the second impedance (Z102) in series connection is the same as the ones from the bi-directional power source such as the frequency of AC power or the period of alternated polarity of the constant or variable alternated polarity power converted from DC power to appear in series resonance status, thereby the bi-directional power input is converted to a bi-directional divided power in series resonance;

A rectifier device (BR101): at least one rectifier device (BR101) is installed to receive the divided power from the two ends of the first impedance (Z101) or the second impedance (Z102), or two or more than two rectifier devices (BR101) are installed to respectively receive the divided power from the two ends of the first impedance (Z101) and the second impedance (Z102) thereby the divided power across the two ends of the first impedance (Z101) or the second impedance (Z102) is rectified to DC power to drive the uni-directional conducting light emitting diode set (L100);

The rectifier device can be constituted by a bridge type rectifier device or by a half-wave rectifier device, whereof the number of rectifier device (BR101) can be one or more than one;

An uni-directional conducting light emitting diode set (L100): The uni-directional conducting light emitting diode set (L100) is constituted by a forward current polarity light emitting diode (LED101), or two or more than two forward current polarity light emitting diodes (LED101) in series connection or parallel connection, or three or more than three forward current polarity light emitting diodes (LED101) in series connection, parallel connection or series and parallel connection;

One or more than one uni-directional conducting light emitting diode set (L100) can be optionally installed as needed to be driven by the DC power output from the rectifier device (BR101);

The uni-directional conducting light emitting diode set (L100) can be optionally installed as following:

The divided power formed across the two ends of the inductive impedance component (I200) of the second impedance (Z102) in series resonance is transmitted to the AC input ends of the rectifier device (BR101), whereof the DC power output from the rectifier device (BR101) is arranged to drive the uni-directional conducting light emitting diode set (L100) while its output current is limited by the capacitive impedance of the capacitor (C100) which constitutes the first impedance;

The divided power formed across the two ends of the capacitor (C100) of the first impedance (Z101) in series resonance is transmitted to the AC input ends of the rectifier device (BR101), whereof the DC power output from the rectifier device (BR101) is arranged to drive the uni-directional conducting light emitting diode set (L100) while its output current is limited by the inductive impedance of the inductive impedance component (I200) which constitutes the second impedance (Z102);

A discharge resistor (R101): It is an optionally installed component as needed to be parallel connected across the two ends of the capacitor (C100) which constitutes the first impedance (Z101) to release the residual charge of capacitor (C100);

A current limit resistor (R103): It is an optionally installed component as needed to be individually series connected with each of light emitting diodes (LED101) which constitute the uni-directional conducting light emitting diode set (L100), whereby to limit the current passing through the light emitting diode (LED101); whereof the current limit resistor (R103) can also be replaced by an inductive impedance component (I103);

The uni-directional light emitting diode drive circuit (U100) is constituted by the first impedance (Z101), the second impedance (Z102), the rectifier device (BR101) and the uni-directional conducting light emitting diode set (L100) according to above said circuit structure;

In addition, the uni-directional conducting light emitting diode set (L100) in the uni-directional light emitting diode drive circuit (U100) of the uni-directional light emitting diode drive circuit in bi-directional power series resonance is through the divided power distribution effect by the parallel connection between the rectifier device (BR101) and the second impedance (Z102) to reduce the voltage variation rate across the two ends of uni-directional conducting light emitting diode set (L100) corresponding to the power source of voltage variation.

Figure 3:
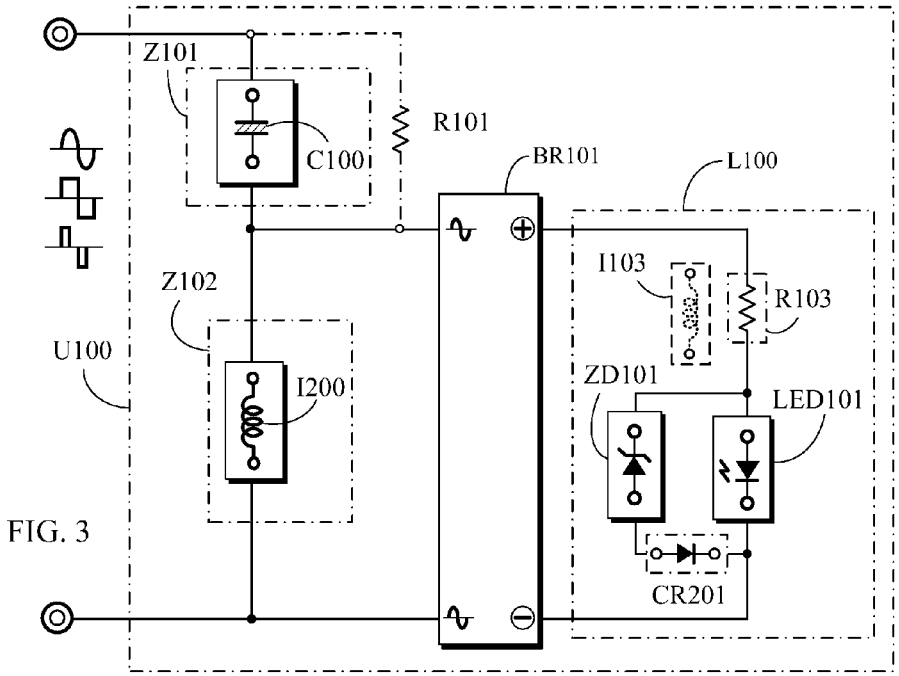
FIG. 3 is a circuit example schematic diagram illustrating that the uni-directional conducting light emitting diode set in the circuit of FIG. 2 is further installed with a zener diode.
Figure 4:
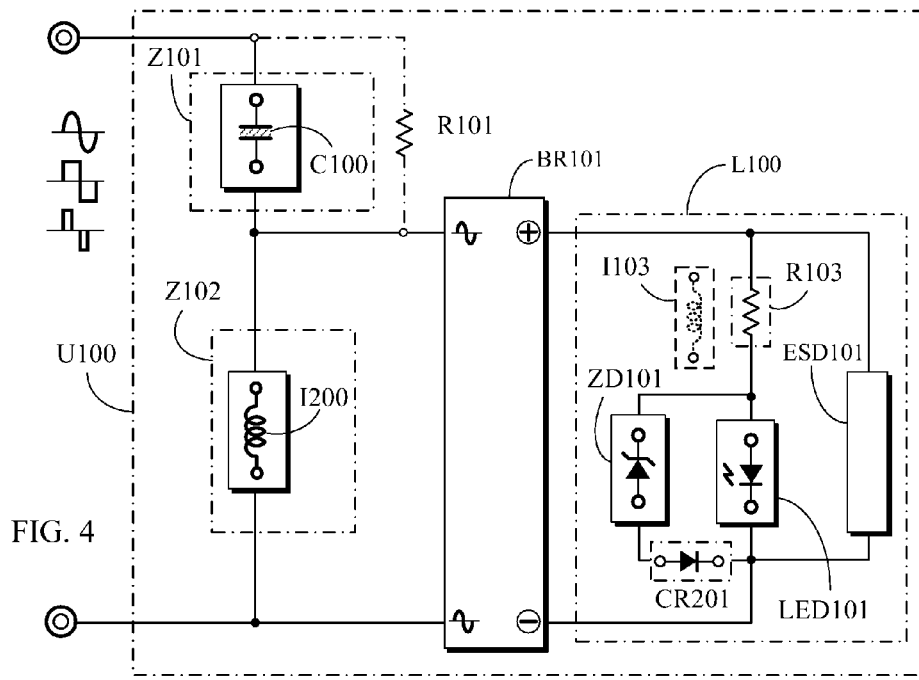
FIG. 4 is a circuit example schematic diagram illustrating that a charge/discharge device is parallel connected across the two ends of the light emitting diode and the current limit resistor in series connection in the circuit of FIG. 3.

The light emitting diode (LED101) which constitutes the uni-directional conducting light emitting diode set (L100) in the uni-directional light emitting diode drive circuit (U100) of the uni-directional light emitting diode drive circuit in bi-directional power series resonance includes the following selections:

The uni-directional conducting light emitting diode set (L100) is constituted by a forward current polarity light emitting diode, or two or more than two forward current polarity light emitting diodes in series connection or parallel connection, or three or more than three forward current polarity light emitting diodes in series connection, parallel connection or series and parallel connection, whereof one set or more than one set of uni-directional conducting light emitting diode set (L100) can be optionally selected as needed;

In addition, to protect the light emitting diode and to avoid the light emitting diode (LED101) being damaged or reduced working life by abnormal voltage, a zener diode can be further parallel connected across the two ends of the light emitting diode (LED101) of the uni-directional conducting light emitting diode set (L100) in the uni-directional light emitting diode drive circuit (U100) of the uni-directional light emitting diode drive circuit in bi-directional power series resonance, or the zener diode can be first series connected with at least one diode to jointly produce the function of zener voltage effect, then to be parallel connected across the two ends of the light emitting diode (LED101);

FIG. 3 is a circuit example schematic diagram illustrating that the uni-directional conducting light emitting diode set in the circuit of FIG. 2 is further installed with a zener diode, whereof it is constituted by the following:

A zener diode (ZD101) is parallel connected across the two ends of the light emitting diode (LED101) of the uni-directional conducting light emitting diode set (L100) in the uni-directional light emitting diode drive circuit (U100), whereof their polarity relationship is that the zener voltage of the zener diode (ZD101) is used to limit the working voltage across the two ends of the light emitting diode (LED101);

A zener diode (ZD101) is parallel connected across the two ends of the light emitting diode (LED101) of the uni-directional conducting light emitting diode set (L100) in the uni-directional light emitting diode drive circuit (U100), whereof the said zener diode (ZD101) can be optionally series connected with a diode (CR201) as needed to produce the zener voltage effect together, whereby the advantages are 1) the zener diode (ZD101) can be protected from abnormal reverse voltage; 2) both diode (CR201) and zener diode (ZD101) have temperature compensation effect;

To promote the lighting stability of the light source produced by the light emitting diode in the uni-directional light emitting diode drive circuit (U100) of the uni-directional light emitting diode drive circuit in bi-directional power series resonance, the light emitting diode (LED101) can be further installed with a charge/discharge device (ESD101), whereof random power charging or discharging can be provided by the charge/discharge device (ESD101) to stabilize the lighting stability of the light emitting diode (LED101), whereby to reduce its lighting pulsation, or in case of power supply off, reserved power can be supplied by the charge/discharge device (ESD101) to drive the light emitting diode (LED101) to emit light continuously;

As shown in FIG. 4, which is a circuit example schematic diagram illustrating that a charge/discharge device is parallel connected across the two ends of the light emitting diode and the current limit resistor in series connection in the circuit of FIG. 3.

Figure 5:
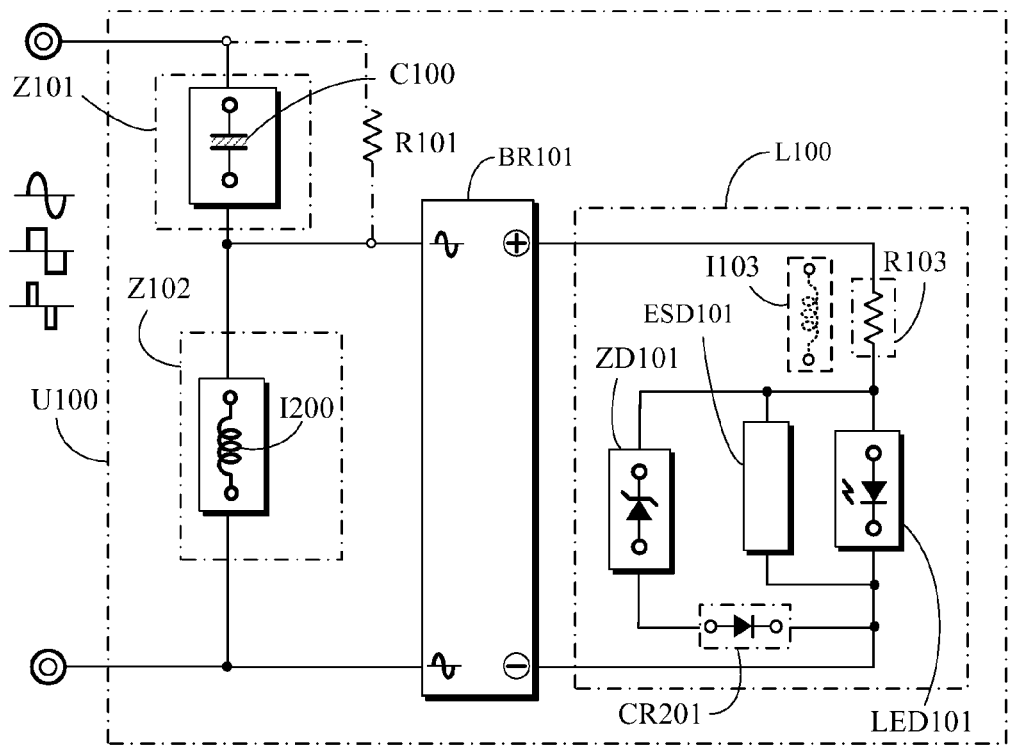
FIG. 5 is a circuit example schematic diagram illustrating that a charge/discharge device is parallel connected across the two ends of the light emitting diode in the circuit of FIG. 3.

As shown in FIG. 5, which is a circuit example schematic diagram illustrating that a charge/discharge device is parallel connected across the two ends of the light emitting diode in the circuit of FIG. 3.

FIG. 4 and FIG. 5 are comprised of that:

The uni-directional conducting light emitting diode set (L100) can be further installed with a charge/discharge device (ESD101) including to be parallel connected across the two ends of the light emitting diode (LED101) and the current limit resistor (R103) in series connection as shown in FIG. 4, or across the two ends of the light emitting diode (LED101) as shown in FIG. 5 according to polarities, whereof random power charging or discharging can be provided by the charge/discharge device (ESD101) to stabilize the lighting stability of the light emitting diode (LED101), whereby to reduce its lighting pulsation, or in case of power supply off, reserved power can be supplied by the charge/discharge device (ESD101) to drive the light emitting diode (LED101) to emit light continuously;

The aforesaid charge/discharge device (ESD101) can be constituted by the conventional charging and discharging batteries, or super-capacitors or capacitors, etc.

Figure 6:
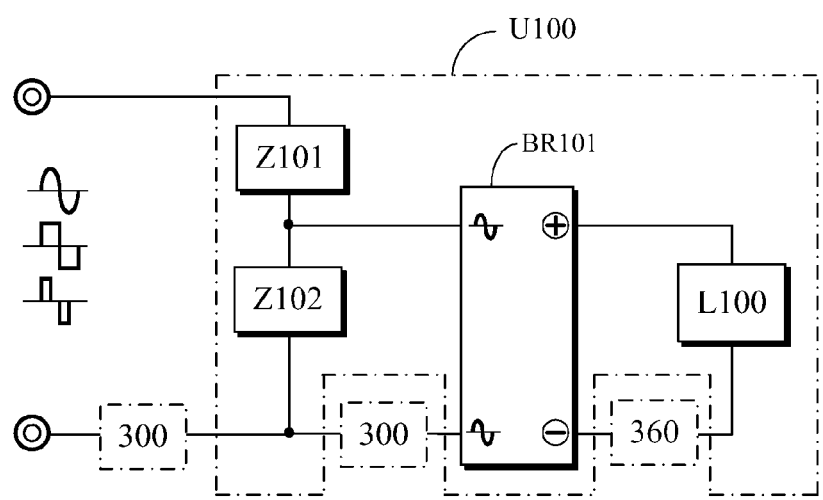
FIG. 6 is a circuit example schematic block diagram of the present invention which is series connected with the power modulator of series connection type.
Figure 7:
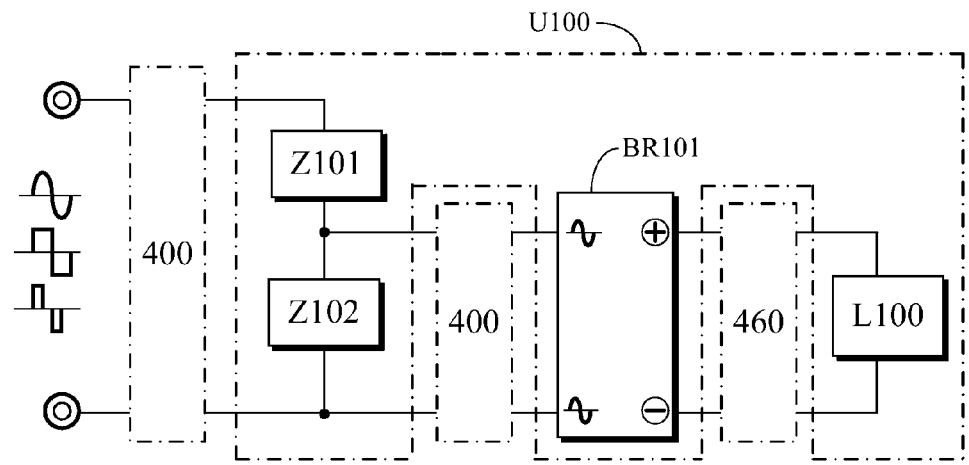
FIG. 7 is a circuit example schematic block diagram of the present invention which is parallel connected with the power modulator of parallel connection type.
Figure 8:
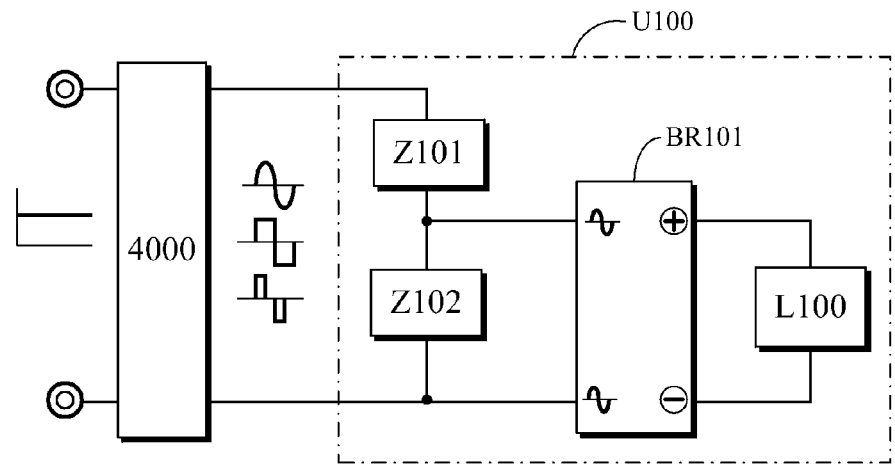
FIG. 8 is a circuit example schematic block diagram of the present invention driven by the DC to AC inverter output power.

The first impedance (Z101), the second impedance (Z102), the rectifier device (BR101) and the uni-directional conducting light emitting diode set (L100) as well as the light emitting diode (LED101) and various aforesaid optional auxiliary circuit components as shown in the circuit examples of FIGS. 1~5 are based on application needs, whereof they can be optionally installed or not installed as needed and the installation quantity include constitution by one, wherein if more than one are selected in the application, the corresponding polarity relationship shall be determined based on circuit function requirement to execute series connection, or parallel connection or series and parallel connections; thereof it is constituted as the following:

1. The first impedance (Z101) can be constituted by a capacitor (C100) or by more than one capacitors (C100) in series connection, parallel connection or series and parallel connection;

2. The second impedance (Z102) can be constituted by an inductive impedance component (I200) or by more than one inductive impedance components (I200) in series connection, parallel connection or series and parallel connection;

3. The light emitting diode (LED101) can be constituted by one light emitting diode or by more than one light emitting diodes in series connection of forward polarities, or in parallel connection of the same polarity, or in series and parallel connection;

4. In the uni-directional conducting light emitting diode set (L100):

(1) An uni-directional conducting light emitting diode set (L100) or more than one uni-directional conducting light emitting diode sets (L100) in series connection, parallel connection or series and parallel connection can be optionally installed as needed in the uni-directional light emitting diode drive circuit (U100), whereof if one or more than one set is installed, it can be driven by the divided power of a common impedance (Z102) through its matched rectifier device (BR101), or it can be individually driven by the divided power of multiple second impedances (Z102) in series or parallel connection, whereof each of the multiple second impedances (Z102) is installed with a rectifier device (BR101) individually to drive its corresponding matched uni-directional conducting light emitting diode set (L100) individually;

(2) If a charge/discharge device (ESD101) is installed in the uni-directional light emitting diode drive circuit (U100), the light emitting diode (LED101) of the uni-directional conducting light emitting diode set (L100) is driven by continuous DC power to emit light;

If the charge/discharge device (ESD101) is not installed, current conduction to light emitting diode (LED101) is intermittent, whereby referring to the input voltage wave shape and duty cycle of current conduction, the light emitting forward current and the peak of light emitting forward voltage of each light emitting diode in the uni-directional conducting light emitting diode set (L100) can be correspondingly selected for the light emitting diode (LED101), whereof the selections include the following:

1) The light emitting peak of forward voltage is lower than the rated forward voltage of light emitting diode (LED101); or 2) The rated forward voltage of light emitting diode (LED101) is selected to be the light emitting peak of forward voltage; or 3) If current conduction to light emitting diode (LED101) is intermittent, the peak of light emitting forward voltage can be correspondingly selected based on the duty cycle of current conduction as long as the principle of that the peak of light emitting forward voltage does not damage the light emitting diode (LED101) is followed;

Based on the value and wave shape of the aforesaid light emitting forward voltage, the corresponding current value and wave shape from the forward voltage vs. forward current ratio are produced; however the peak of light emitting forward current shall follow the principle not to damage the light emitting diode (LED101);

The luminosity or the stepped or step-less luminosity modulation of the forward current vs. relative luminosity can be controlled based on the aforesaid value and wave shape of forward current;

5. The discharge resistor (R101) can be optionally installed as needed to be constituted by one resistor, or by more than one resistors in series connection or parallel connection or series and parallel connection;

6. The current limit resistor (R103) can be optionally installed as needed to be constituted by one resistor, or by more than one resistors in series connection or parallel connection or series and parallel connection;

7. The inductive impedance component (I103) can be constituted by one impedance component, or by more than one impedance components in series connection or parallel connection or series and parallel connection, whereof said devices can be optionally installed as needed;

8. The zener diode (ZD101) can be constituted by one zener diode, or by more than one zener diodes in series connection or parallel connection or series and parallel connection, whereof said devices can be optionally installed as needed;

9. The diode (CR201) can be constituted by one diode, or by more than one diodes in series connection or parallel connection or series and parallel connection, whereof said devices can be optionally installed as needed;

10. The charge/discharge device (ESD101) can be constituted by one, or by more than ones in series connection or parallel connection or series and parallel connection, whereof said devices can be optionally installed as needed;

In the application of the uni-directional light emitting diode drive circuit (U100) of the uni-directional light emitting diode drive circuit in bi-directional power series resonance, the following different types of bi-directional power can be provided for inputs, whereof the bi-directional power includes that:

1) The AC power with a constant or variable voltage and a constant or variable frequency; or 2) The AC power of bi-directional sinusoidal wave voltage or bi-directional square wave voltage, or bi-directional pulse wave voltage with constant or variable voltage and constant or variable frequency or period which is converted from a DC power source; or 3) The AC power of bi-directional sinusoidal wave voltage or bi-directional square wave voltage, or bi-directional pulse wave voltage with constant or variable voltage and constant or variable frequency or period converted from the DC power which is further rectified from an AC power;

In addition, the following active modulating circuit devices can be further optionally combined as needed, whereof various applied circuits are the following 1. FIG. 6 is a circuit example schematic block diagram of the present invention which is series connected to the power modulator of series connection type, whereof the power modulator of series connection type is constituted by the following:

A bi-directional power modulator of series connection type (300): It is constituted by the conventional electromechanical components or solid state power components and related electronic circuit components to modulate the power output of the bi-directional power;

A DC power modulator of series connection type (360): It is constituted by the conventional electromechanical components or solid state power components and related electronic circuit components to modulate the DC power with stable voltage, or the power output of the DC pulsed power;

The circuit operating functions are the following:

(1) The bi-directional power modulator of series connection type (300) can be optionally installed as needed to be series connected with the uni-directional light emitting diode drive circuit (U100) to receive the bi-directional power from power source, whereby the bi-directional power from power source is modulated by the bi-directional power modulator of series connection type (300) to execute power modulations such as pulse width modulation or current conduction phase angle control, or impedance modulation, etc. to drive the uni-directional conducting light emitting diode set (L100); or (2) The bi-directional power modulator of series connection type (300) can be optionally installed as needed to be series connected between the second impedance (Z102) and the AC input ends of the rectifier device (BR101) whereby the bi-directional divided power from the two ends of the second impedance (Z102) is modulated by the bi-directional power modulator of series connection type (300) to execute power modulations such as pulse width modulation or current conduction phase angle control, or impedance modulation, etc. to drive the uni-directional conducting light emitting diode set (L100) through the rectifier device (BR101); or (3) The DC power modulator of series connection type (360) can be optionally installed as needed to be series connected between the DC output ends of the rectifier device (BR101) and the uni-directional conducting light emitting diode set (L100), whereby the DC power from the rectifier device (BR101) is modulated by the DC power modulator of series connection type (360) to execute power modulations such as pulse width modulation or current conduction phase angle control, or impedance modulation, etc. to drive the uni-directional conducting light emitting diode set (L100);

2. FIG. 7 is a circuit example schematic block diagram of the present invention which is parallel connected to a power modulator of parallel connection type, whereof the power modulator of parallel connection type is constituted by the following:

A bi-directional power modulator of parallel connection type (400): It is constituted by the conventional electromechanical components or solid state power components and related electronic circuit components to modulate the power output of the bi-directional power;

A DC power modulator of parallel connection type (460): It is constituted by the conventional electromechanical components or solid state power components and related electronic circuit components to modulate the DC power with stable voltage, or the power output of the DC pulsed power;

The circuit operating functions are the following:

(1) The bi-directional power modulator of parallel connection type (400) can be optionally installed as needed, whereof its output ends are parallel connected with the uni-directional light emitting diode drive circuit (U100), while its input ends are provided for receiving the bi-directional power from the power source, whereby the bi-directional power from the power source is modulated by the bi-directional power modulator of parallel connection type (400) to execute power modulations such as pulse width modulation or current conduction phase angle control, or impedance modulation, etc. to drive the uni-directional light emitting diode drive circuit (U100); or (2) The bi-directional power modulator of parallel connection type (400) can be optionally installed as needed, whereof its output ends are parallel connected with the bi-directional power input ends of the rectifier device (BR101) while its input ends are parallel connected across the two ends of the second impedance (Z102), whereby the bi-directional divided power across the two ends of the second impedance (Z102) is modulated by the bi-directional power modulator of parallel connection type (400) to execute power modulations such as pulse width modulation or current conduction phase angle control, or impedance modulation, etc. to drive the uni-directional conducting light emitting diode set (L100) by the DC power rectified by the rectifier device (BR101); or (3) The DC power modulator of parallel connection type (460) can be optionally installed as needed, whereof its output ends are parallel connected with the uni-directional conducting light emitting diode set (L100), while its input ends are parallel connected with the DC output ends of the rectifier device (BR101), whereby the DC power from the rectifier device (BR101) is modulated by the DC power modulator of parallel connection type (460) to execute power modulations such as pulse width modulation or current conduction phase angle control, or impedance modulation, etc. to drive the uni-directional conducting light emitting diode set (L100);

3. FIG. 8 is a circuit example schematic block diagram of the present invention driven by the power outputted from a DC to AC inverter;

It is mainly comprised of that:

A DC to AC Inverter (4000): it is constituted by the conventional electromechanical components or solid state power components and related electronic circuit components, whereof its input ends are optionally provided as needed to receive input from a constant or variable voltage DC power, or a DC power rectified from an AC power or the other DC power, while its output ends are optionally selected as needed to supply a AC power of bi-directional sinusoidal wave, or bi-directional square wave or bi-directional pulsed wave with constant or variable voltage and constant or variable polarity alternated frequency or periods.

The circuit operating functions are the following:

The uni-directional light emitting diode drive circuit (U100) is parallel connected with the output ends of the DC to AC inverter (4000), and the input ends of the DC to AC inverter (4000) are arranged to receive the optionally selected DC power with constant or variable voltage, or the DC power rectified from AC power;

The output ends of the DC to AC inverter (4000) can be optionally selected as needed to supply a power of bi-directional sinusoidal wave, or bi-directional square wave or bi-directional pulsed wave with constant or variable voltage and constant or variable alternated polarity periods, thereby to control and drive the uni-directional light emitting diode drive circuit (U100);

In addition, the uni-directional light emitting diode drive circuit (U100) can be controlled and driven by modulating the output power from the DC to AC inverter (4000), or by executing power modulations such as pulse width modulation, or current conduction phase angle control, or impedance modulation, etc. to the power outputted;

4. The uni-directional light emitting diode drive circuit (U100) is arranged to be series connected with a least one conventional impedance component (500) and to be further parallel connected with the power source, whereof the impedance (500) includes that:

1) An impedance component (500): it is constituted by a component with capacitive impedance characteristics; or 2) An impedance component (500): it is constituted by a component with inductive impedance characteristics; or 3) An impedance component (500): it is constituted by a component with resistive impedance characteristics; or 4) An impedance component (500): it is constituted by a single impedance component with the combined impedance characteristics of at least two of the resistive impedance, or inductive impedance, or capacitive impedance simultaneously, thereby to provide DC or AC impedances; or 5) An impedance component (500): it is constituted by a single impedance component with the combined impedance characteristics of capacitive impedance and inductive impedance, whereof its inherent resonance frequency is the same as the frequency or period of bi-directional or uni-directional pulsed power, thereby to produce a parallel resonance status; or 6) An impedance component (500): it is constituted by capacitive impedance components, or inductive impedance components, or resistive impedance components, including one or more than one kind of one and more than one impedance component, or two or more than two kinds of impedance components in series connection, or parallel connection, or series and parallel connections, thereby to provide a DC or AC impedance; or 7) An impedance component (500): it is constituted by the mutual series connection of a capacitive impedance component and an inductive impedance component, whereof its inherent series resonance frequency is the same as the frequency or period of bi-directional or uni-directional pulsed power, thereby to produce a series resonance status and the end voltage across two ends of the capacitive impedance component or the inductive impedance component appear in series resonance correspondingly;

Or the capacitive impedance and the inductive impedance are in mutual parallel connection, whereby its inherent parallel resonance frequency is the same as the frequency or period of bi-directional or uni-directional pulsed power, thereby to produce a parallel resonance status and appear the corresponding end voltage.

Figure 9:
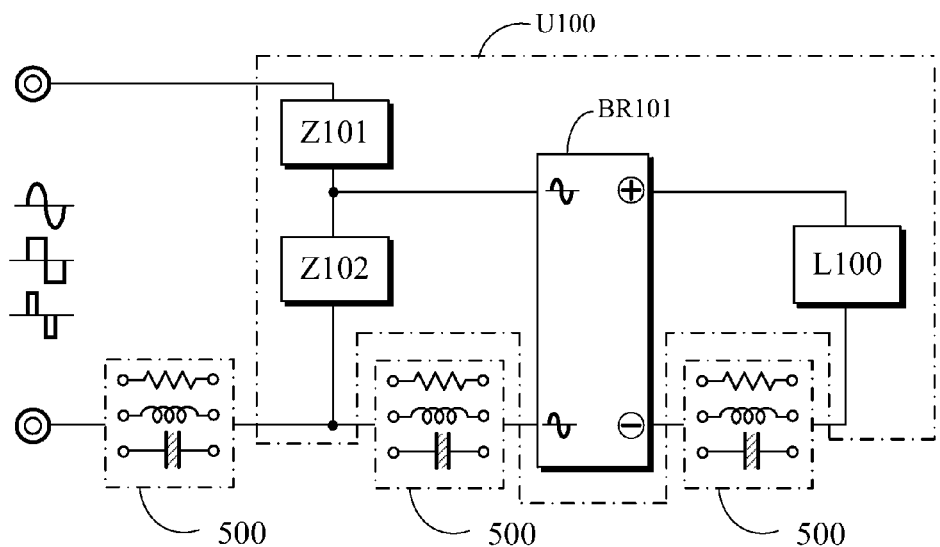
FIG. 9 is a circuit example schematic block diagram of the present invention which is series connected with impedance components.
Figure 10:
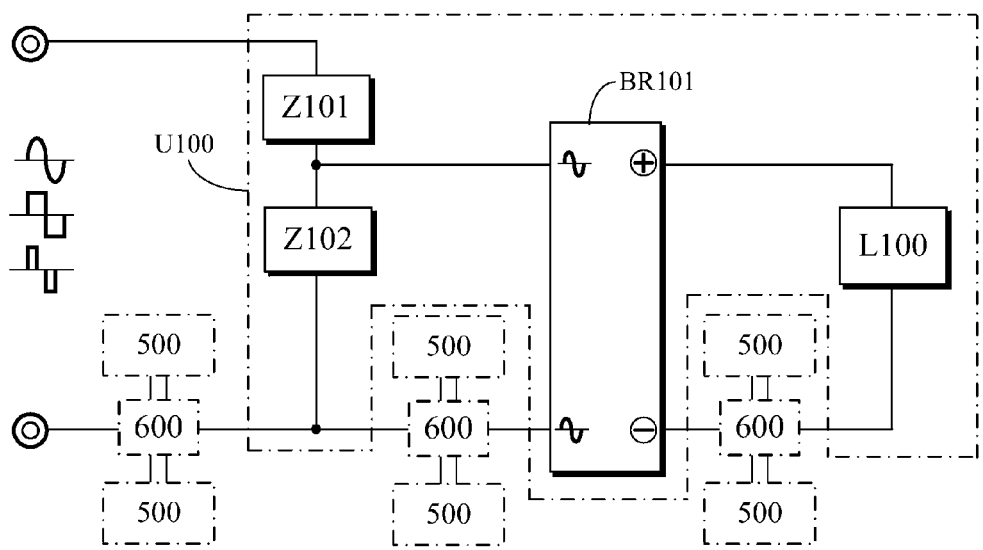
FIG. 10 is a circuit example schematic block diagram of the present invention illustrating that the impedance components in series connection execute series connection, or parallel connection, or series and parallel connection by means of the switching device.

FIG. 9 is a circuit example schematic block diagram of the present invention which is series connected with impedance components;

5. At least two impedance components (500) as said in the item 4 execute switches between series connection, parallel connection and series and parallel connection bye means of the switching device (600) which is constituted by electro-mechanical components or solid state components, whereby to modulate the power transmitted to the uni-directional light emitting diode drive circuit (U100), wherein FIG. 10 is a circuit example schematic block diagram of the present invention illustrating that the impedance components in series connection execute series connection, or parallel connection, or series and parallel connection by means of the switching device.

The uni-directional light emitting diode drive circuit in bi-directional power series resonance, in which the optionally installed inductive impedance component (I200) of the second impedance (Z102) can be further replaced by the power supply side winding of a transformer with inductive effect, whereof the transformer can be a self-coupled transformer (ST200) with self-coupled voltage change winding or a transformer (IT200) with separating type voltage change winding.

Figure 11:
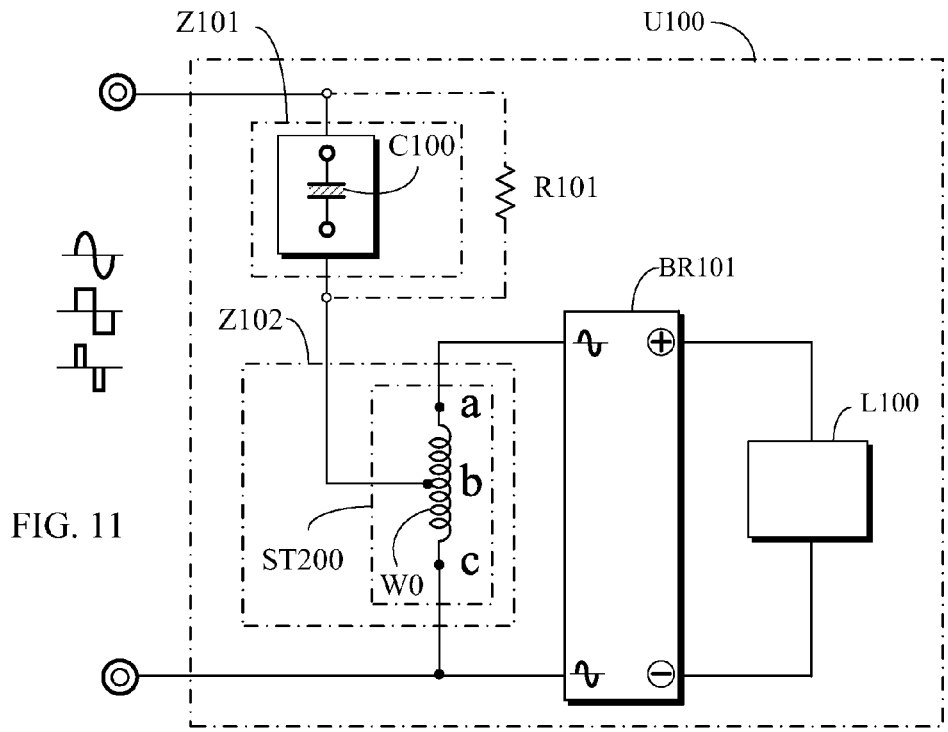
FIG. 11 is a circuit example schematic diagram of the present invention illustrating that the inductive impedance component of the second impedance is replaced by the self-coupled voltage change power supply side winding of the self-coupled transformer thereby to constitute a voltage rise.

FIG. 11 is a circuit example schematic diagram of the present invention illustrating that the inductive impedance component of the second impedance is replaced by the self-coupled voltage change power supply side winding of the self-coupled transformer thereby to constitute a voltage rise; whereof as shown in FIG. 11, the self-coupled transformer (ST200) has a self-coupled voltage change winding (W0) with voltage raising function, the b, c ends of the self-coupled voltage change winding (W0) of the self-coupled transformer (ST200) are the power supply side which replace the inductive impedance component (I200) of the second impedance (Z102), whereof its inherent series resonance frequency with the capacitor (C100) of the first impedance (Z101) in series connection is the same as the frequency of the bi-directional power source such as the AC power or the alternated polarity period of the constant or variable voltage and constant or variable periodically alternated polarity power converted from DC power to appear series resonance status, thereby to constitute the second impedance (Z102), whereof the a, c output ends of the self-coupled voltage change winding (W0) of the self-coupled transformer (ST200) are arranged to provide the AC power of voltage rise to the AC input ends of the rectifier device (BR101), while the output ends of the rectifier device (BR101) are used to drive the uni-directional conducting light emitting diode set (L100).

Figure 12:
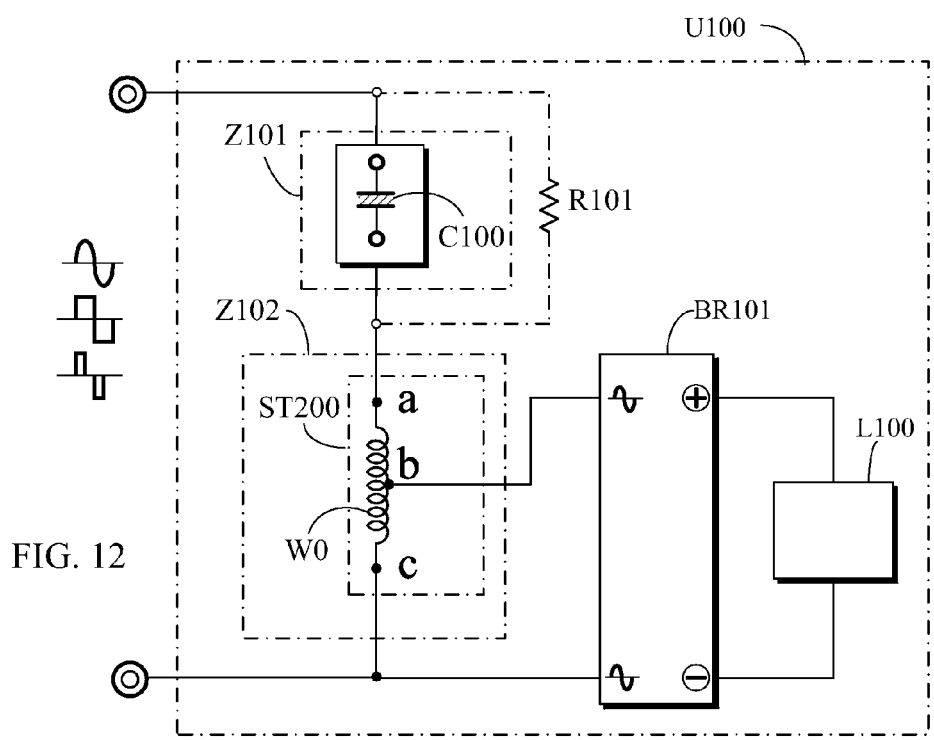
FIG. 12 is a circuit example schematic diagram of the present invention illustrating that the inductive impedance component of the second impedance is replaced by the self-coupled voltage change power supply side winding of the self-coupled transformer thereby to constitute a voltage drop.
Figure 13:
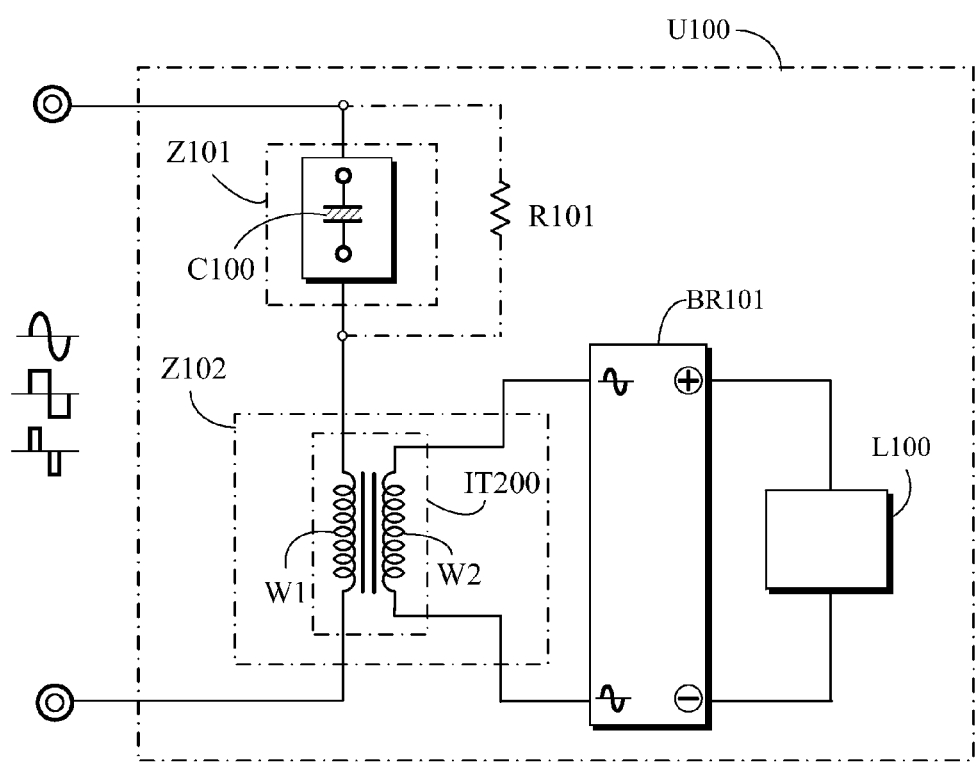
FIG. 13 is a circuit example schematic diagram of the present invention illustrating that the inductive impedance component of the second impedance is replaced by the primary side winding of the separating type transformer with separating type voltage change winding.

FIG. 12 is a circuit example schematic diagram of the present invention illustrating that the inductive impedance component of the second impedance is replaced by the self-coupled voltage change power supply side winding of the self-coupled transformer thereby to constitute a voltage drop, whereof as shown in FIG. 12, the self-coupled transformer (ST200) has a self-coupled voltage change winding (W0) with voltage drop function, the a, c ends of the self-coupled voltage change winding (W0) of the self-coupled transformer (ST200) are the power supply side which replace the inductive impedance component (I200) of the second impedance (Z102), whereof its inherent series resonance frequency with the capacitor (C100) of the first impedance (Z101) in series connection is the same as the frequency of the bi-directional power source such as the AC power or the alternated polarity period of the constant or variable voltage and constant or variable periodically alternated polarity power converted from DC power to appear series resonance status, thereby to constitute the second impedance (Z102), whereof the b, c output ends of the self-coupled voltage change winding (W0) of the self-coupled transformer (ST200) are arranged to provide the AC power of voltage drop to the AC input ends of the rectifier device (BR101), while the output ends of the rectifier device (BR101) are used to drive the uni-directional conducting light emitting diode set (L100);

FIG. 13 is a circuit example schematic diagram of the present invention illustrating that the inductive impedance component of the second impedance is replaced by the primary side winding of the separating type transformer with separating type voltage change winding, whereof as shown in FIG. 13, the separating type transformer (IT200) is comprised of a primary side winding (W1) and a secondary side winding (W2), in which the primary side winding (W1) and the secondary side winding (W2) are separated, whereof the primary side winding (W1) is series connected with the capacitor (C100), whereof its inherent series resonance frequency after series connection is the same as the frequency of the bi-directional power source such as the AC power or the alternated polarity period of the constant or variable voltage and constant or variable periodically alternated polarity power converted from DC power to appear series resonance status, thereby to constitute the second impedance (Z102), whereof the output voltage of the secondary side winding (W2) of the separating type transformer (IT200) can be optionally selected as voltage rise or voltage drop so that the AC power outputted from the secondary side winding is arranged to transmit to the AC input ends of the rectifier device (BR101), while the DC output ends of the rectifier device (BR101) are used to drive the uni-directional conducting light emitting diode set (L100).

Through the above description, the inductive impedance component (I200) of the second impedance (Z102) is replaced by the power supply side winding of the transformer, whereof the secondary side of the separating type transformer (IT200) provides AC power of voltage rise or voltage drop to the AC input ends of the rectifier device (BR101) while the DC output ends of the rectifier device (BR101) are used to drive the uni-directional conducting light emitting diode set (L100).

Color of the individual light emitting diodes (LED101) of the uni-directional conducting light emitting diode set (L100) in the uni-directional light emitting diode drive circuit (U100) of the uni-directional light emitting diode drive circuit in bi-directional power series resonance can be optionally selected to be constituted by one or more than one colors.

The relationships of location arrangement between the individual light emitting diodes (LED101) of the uni-directional conducting light emitting diode set (L100) in the uni-directional light emitting diode drive circuit (U100) of the uni-directional light emitting diode drive circuit in bi-directional power series resonance include the following: 1) sequentially linear arrangement; 2) sequentially distributed in a plane; 3) crisscross-linear arrangement; 4) crisscross distribution in a plane; 5) arrangement based on particular geometric positions in a plane; 6) arrangement based on 3D geometric position.

The uni-directional light emitting diode drive circuit in bi-directional power series resonance, in which the embodiments of its uni-directional light emitting diode drive circuit (U100) are constituted by circuit components which include: 1) It is constituted by individual circuit components which are inter-connected; 2) At least two circuit components are combined to at least two partial functioning units which are further inter-connected; 3) All components are integrated together to one structure.

As is summarized from above descriptions, progressive performances of power saving, low heat loss and low cost can be provided by the uni-directional light emitting diode drive circuit in bi-directional power series resonance through the charging/discharging by the uni-polar capacitor to drive the light emitting diode.

The invention claimed is:

1. A uni-directional light emitting diode drive circuit in bi-directional power series resonance, comprising:
  first and second terminals for receiving power input bi-directional power from a bi-directional power source;
    a capacitive impedance component;
    an inductive impedance component that is connected to the capacitive impedance component at an intermediate connection node, the inductive impedance component and capacitive impedance component forming a series circuit that is connected between the first and second power input terminals and that is in series resonance status with the bi-directional power source;
  a rectifier device that is connected to the intermediate connection point and that provides DC power; and
  a uni-directional light emitting unit that is driven by the DC power,
  wherein the capacitive impedance component comprises at least one capacitor and the inductive impedance component comprises at least one inductor,
  wherein the bi-directional power is one of AC power with a constant or variable voltage and a constant or variable frequency, bi-directional square wave power with a constant or variable voltage and constant or variable frequency, and bi-directional pulse wave power with a constant or variable voltage and constant or variable frequency,
  wherein the rectifier device comprises at least one bridge rectifier or at least one half-wave rectifier, and
  wherein the light emitting unit comprises one of an LED, a plurality of LEDs connected in series, and a plurality of LEDs connected in parallel.

2. A uni-directional light emitting diode drive circuit in bi-directional power series resonance, comprising:
  first and second power input terminals for receiving bi-directional power from a bidirectional power source;
  a capacitive impedance component;
  an inductive impedance component that is connected to the capacitive impedance component at an intermediate connection node, the inductive impedance component and capacitive impedance component forming a series circuit that is connected between the first and second power input terminals and that is in series resonance status with the bi-directional power source;
  a rectifier device that is connected to the intermediate connection point and that provides DC power;
  a uni-directional light emitting diode that is driven by the DC power; and
  a zener diode connected to the light emitting diode to protect the light emitting diode and to avoid keep the light emitting diode from being damaged or sustaining a working life reduction due to abnormal voltage.

3. A uni-directional light emitting diode drive circuit in bi-directional power series resonance, comprising:
  first and second power input terminals for receiving bi-directional power from a bidirectional power source;
  a capacitive impedance component;
  an inductive impedance component that is connected to the capacitive impedance component at an intermediate connection node, the inductive impedance component and capacitive impedance component forming a series circuit that is connected between the first and second power input terminals and that is in series resonance status with the bi-directional power source;
  a rectifier device that is connected to the intermediate connection point and that provides DC power; and
  a uni-directional light emitting diode that is driven by the DC power,
  wherein the uni-directional light emitting diode drive circuit is series connected to a power modulator, the power modulator being selected from the group consisting of a bi-directional power modulator and a DC power modulator.

4. A uni-directional light emitting diode drive circuit in bi-directional power series resonance, comprising:
  first and second power input terminals for receiving bi-directional power from a bidirectional power source;
  a capacitive impedance component;
  an inductive impedance component that is connected to the capacitive impedance component at an intermediate connection node, the inductive impedance component and capacitive impedance component forming a series circuit that is connected between the first and second power input terminals and that is in series resonance status with the bi-directional power source;
  a rectifier device that is connected to the intermediate connection point and that provides DC power; and
  a uni-directional light emitting diode that is driven by the DC power,
  wherein the uni-directional light emitting diode drive circuit is parallel connected to a power modulator, the power modulator being selected from the group consisting of a bi-directional power modulator and a DC power modulator.

5. A uni-directional light emitting diode drive circuit in bi-directional power series resonance, comprising:
  first and second power input terminals for receiving bi-directional power from a bidirectional power source;
  a capacitive impedance component;
  an inductive impedance component that is connected to the capacitive impedance component at an intermediate connection node, the inductive impedance component and capacitive impedance component forming a series circuit that is connected between the first and second power input terminals and that is in series resonance status with the bi-directional power source;

a rectifier device that is connected to the intermediate connection point and that provides DC power; and a uni-directional light emitting unit that is driven by the DC power, wherein the uni-directional light emitting diode drive circuit is arranged to be series connected with a least one conventional impedance component and to be parallel connected with the power source, the at least one conventional impedance being selected from the group consisting of a component with capacitive impedance characteristics, component with inductive impedance characteristics, and a component with resistive impedance characteristics.

6. A uni-directional light emitting diode drive circuit in bi-directional power series resonance comprising:

first and second power input terminals for receiving bi-directional power from a bidirectional power source;

a capacitive impedance component;

an inductive impedance component that is connected to the capacitive impedance component at an intermediate connection node, the inductive impedance component and capacitive impedance component forming a series circuit that is connected between the first and second power input terminals and that is in series resonance status with the bi-directional power source;

a rectifier device that is connected to the intermediate connection point and that provides DC power;

a uni-directional light emitting diode that is driven by the DC power; and an inductive impedance component connected to the light emitting diode.

7. A uni-directional light emitting diode drive circuit in bi-directional power series resonance, comprising:

first and second power input terminals for receiving bi-directional power from a bidirectional power source;

a capacitive impedance component;

an inductive impedance component that is connected to the capacitive impedance component at an intermediate connection node, the inductive impedance component and capacitive impedance component forming a series circuit that is connected between the first and second power input terminals and that is in series resonance status with the bi-directional power source;

a rectifier device that is connected to the inductive impedance component and that provides DC power; and a uni-directional light emitting element that is driven by the DC power, wherein the inductive impedance component comprises a transformer having first and second windings, the first winding having an end that is connected to the capacitive impedance component at the intermediate connection node and the second winding being connected to the rectifier device.

* * * * *